United States Patent [19]
Chikuma et al.

[11] Patent Number: 5,182,669
[45] Date of Patent: Jan. 26, 1993

[54] HIGH DENSITY OPTICAL DISK AND METHOD OF MAKING

[75] Inventors: Kiyofumi Chikuma; Kiyoshi Takei, both of Saitama, Japan

[73] Assignee: Pioneer Electronic Corporation, Tokyo, Japan

[21] Appl. No.: 902,422

[22] Filed: Jun. 24, 1992

Related U.S. Application Data

[63] Continuation of Ser. No. 637,686, Jan. 7, 1991, abandoned.

[30] Foreign Application Priority Data

Jun. 4, 1990 [JP] Japan .................................. 2-145916

[51] Int. Cl.$^5$ .............................................. G11B 3/70
[52] U.S. Cl. ............................ 359/241; 359/321; 359/900; 369/284; 369/288
[58] Field of Search ............ 359/321, 900; 369/106, 369/108, 116, 120, 283, 284, 285, 286, 288, 99, 100, 101; 428/64, 65, 690

[56] References Cited

U.S. PATENT DOCUMENTS

| | | |
|---|---|---|
| 4,367,930 | 1/1983 | Kolb, Jr. .............................. 352/27 |
| 4,551,827 | 11/1985 | Custer et al. ........................ 369/101 |
| 4,819,210 | 4/1989 | Miura et al. ........................ 365/106 |
| 4,927,681 | 5/1990 | Chikuma .............................. 428/64 |

FOREIGN PATENT DOCUMENTS

| | | |
|---|---|---|
| 0354601 | 2/1990 | European Pat. Off. . |
| 61-205861 | 3/1988 | Japan . |
| 61-275358 | 6/1988 | Japan . |
| 61-275359 | 6/1988 | Japan . |
| 62-258793 | 4/1989 | Japan . |

Primary Examiner—Frank Gonzalez
Attorney, Agent, or Firm—Foley & Lardner

[57] ABSTRACT

A method of manufacturing an optical disk on which light-emitting regions for absorbing a laser beam and emitting light of a wavelength different from that of the laser beam and reflection regions for reflecting a laser beam irradiated thereon are alternately arranged, comprises the steps of forming a reflection layer on a transparent substrate, forming a plurality of through holes in the reflection layer, and filling a light-emitting layer consisting of a fluorescent member in the through holes, thereby a high density optical disk can be manufactured.

6 Claims, 2 Drawing Sheets

Fig. 2A1 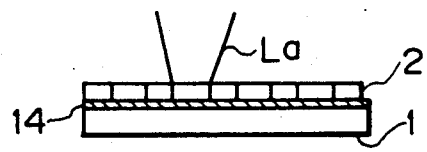
Fig. 2A2 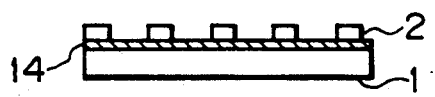

HIGH DENSITY OPTICAL DISK AND METHOD OF MAKING

This application is a continuation of application Ser. No. 07/637,686, filed Jan. 7, 1991 and now abandoned.

BACKGROUND OF THE INVENTION

1. Field of the Invention

The present invention relates to a method of manufacturing an optical disk.

2. Description of the Related Art

On an optical information recording medium, e.g., an optical disk, such as a compact disk (CD) or a video disk, information is recorded as the presence/absence (arrangement) of minute pits on tracks. In reproducing the information, an optical pickup, which traces on the tracks, detects a change in reflection light of a laser beam emitted on the pits as an electric signal.

Such optical disk have been manufactured as follows. First, a photoresist is coated on a glass master disk, and minute laser beam spots are then emitted on the master disk to deform those beam-hit regions of the photoresist by means of a cutting machine. The optically deformed regions are discretely formed in accordance with information signals. After the master disk has undergone a developing process, only the optically deformed regions are removed from the top of the master disk, leaving minute pits formed thereon. This master disk is subjected to nickel plating, then to electroforming to grow the nickel metal layer, thus forming a stamper. Using the stamper, information pits are transferred onto a transparent resin by an injection device, yielding a substrate. Metal, such as aluminum, is vapor-deposited on the substrate to form a reflection layer, and the resultant structure becomes an optical disk, such as CD.

According to the conventional information recording/reproducing system using such optical disks, the resolution of detectable information (sizes of pits or regions) is limited by the maximum spatial frequency of $2NA/\lambda$ in light of the frequency characteristic, where NA is the number of apertures of the lens of the reproducing optical system and $\lambda$ is the wavelength of light used to detect recorded information. Since the practical, maximum spatial frequency of reproducible recorded information is approximately 1.0 to 1.5 times $NA/\lambda$, the high density of an optical disk is also limited.

Although various types of high-density optical disks have been developed, practical methods of manufacturing such high-density optical disks have not yet sufficiently been developed.

SUMMARY OF THE INVENTION

It is therefore an object of the present invention to provide a simple method of manufacturing an optical disk which can ensure information recording/reproduction at high density.

According to one aspect of the present invention, there is provided a method of manufacturing an optical information recording disk on which light-emitting regions for absorbing a laser beam and emitting light of a wavelength different from that of the laser beam and reflection regions for reflecting a laser beam irradiated thereon are alternately arranged, the method comprising the steps of:

forming a reflection layer on a transparent substrate;
forming a plurality of through holes in the reflection layer; and
filling a light-emitting member in the through holes.

According to a second aspect of the present invention, there is provided an optical information recording disk comprising;

a transparent substrate;
a reflection layer formed on one flat main surface of said substrate having a track of a plurality of minute through holes formed whereon;
a light-emitting member with which said through holes are filled, said light-emitting member absorbing a laser beam and emitting a light of a wavelength different from that of the irradiated laser beam.

BRIEF DESCRIPTION OF THE DRAWINGS

FIGS. 2A1–2F present cross sections of individual elements of optical disk in individual steps illustrating one embodiment of an optical disk manufacturing method according to the present invention.

DETAILED DESCRIPTION OF THE PREFERRED EMBODIMENT

A preferred embodiment of the present invention will now be described referring to the accompanying drawings.

Figure 1A:
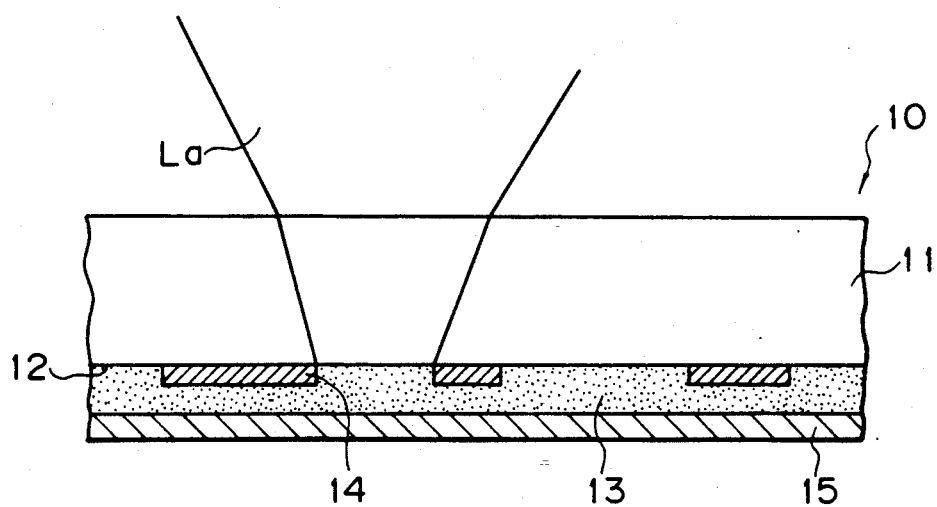
FIGS. 1A and FIG. 1B are cross sections of one embodiment of an optical disk according to the present invention.

FIG. 1A presents a cross section illustrating one embodiment of an optical information recording medium according to the present invention. Referring to this diagram, a transparent substrate 11 comprises a transparent glass disk, and has a reflection layer 14 formed on one flat main surface, with tracks of minute through holes 12 formed on the reflection layer 14 in spiral form or concentrically, for example. The through holes 12 on the substrate 11 are filled with a light-emitting member, which is sensitive to light irradiated from the other main surface side of the substrate 11 to emit light of a wavelength different from that of the irradiated light, forming light-emitting regions. In other words, a light-emitting layer 13 extending continuously from the light-emitting member is formed outside the reflection layer 14. The light-emitting member may be a photoluminescent material, fluorescent chromatophore or fluorescent member. The reflection layer 14 reflects light irradiated from the other main surface side of the substrate 11, and the through holes 12 pass light emitted from the light-emitting regions 13. A protective layer 15 is formed on the light-emitting layer 13. A laser beam La is irradiated from the side of the substrate 11. The substrate 11 of a recording medium 10 with the above structure may be a disk of a transparent resin, such as an acrylic resin or polycarbonate, copied from, for example, a stamper prepared in the mastering step for a conventional optical disk, besides the glass disk. The through holes 12 therefore correspond to the pits on the conventional optical disk. In other words, information is recorded as the arrangement of island-shaped light-emitting regions 13 defined in the through holes 12.

The above optical disk 10 is manufactured through the following steps. First, a photoresist master disk having an aluminum reflection layer 14 and a photoresist layer 2 formed uniformly in this order on the main surface of the glass disk 1 to be a substrate is prepared, as shown in FIG. 2A1, and latent image in tracks of spots corresponding to given information are formed in spiral form or concentrically on the photoresist layer 2 using the laser beam La in a laser cutting step.

Then, in a developing step, the exposed photoresist master disk is set in a developing device and developed to provide tracks of minute upheavals (hereinafter referred to as pits) corresponding to signals to be recorded, on the photoresist master disk. This yields a developing master disk comprising the glass disk 1 and the pits-formed photoresist layer 2 as an information recording layer, as shown in FIG. 2A2.

Figure 2B:

In the next post-baking step, the photoresist layer 2 of the developing master disk is dried to be fixed on the reflection layer 14, providing a dry master disk as shown in FIG. 2B.

Figure 2C:
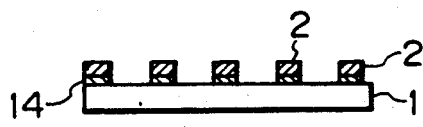
Figure 2D:
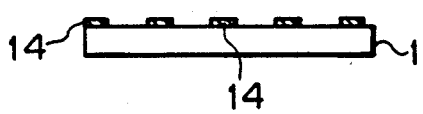

In an etching step, the dry master disk is attached to an etching device, and is soaked in an etching liquid to corrode those portions of the reflection layer 14 which correspond to the pits. Thus, tracks of through holes 12 or pits corresponding to recording signals are formed in the reflection layer 14, yielding a disk as shown in FIG. 2C. With the photoresist layer 2 removed, a reflection layer base disk including the glass disk 1 and the through-holes formed reflection layer 14, which is an information recording layer, is obtained as shown in FIG. 2D.

Figure 2E:
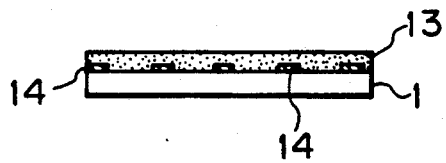

In the next light-emitting layer forming step, the base disk of the reflection layer having the through holes 12 is attached to a spin coating device. A fluorescent liquid, which has a fluorescent member carried in the proper transparent resin solvent, is uniformly coated on the reflection layer 14, and is dried, thus forming the light-emitting layer 11 including the fluorescent member on the reflection layer 14. As a result, the base disk as shown in FIG. 2E is obtained.

Figure 2F:
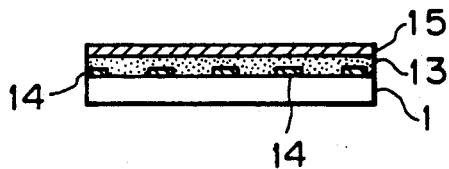

The protective layer 15 is formed on the light-emitting layer 11 consisting of the fluorescent member by a well-known method, thus yielding an optical disk shown in FIG. 2F.

Figure 1B:
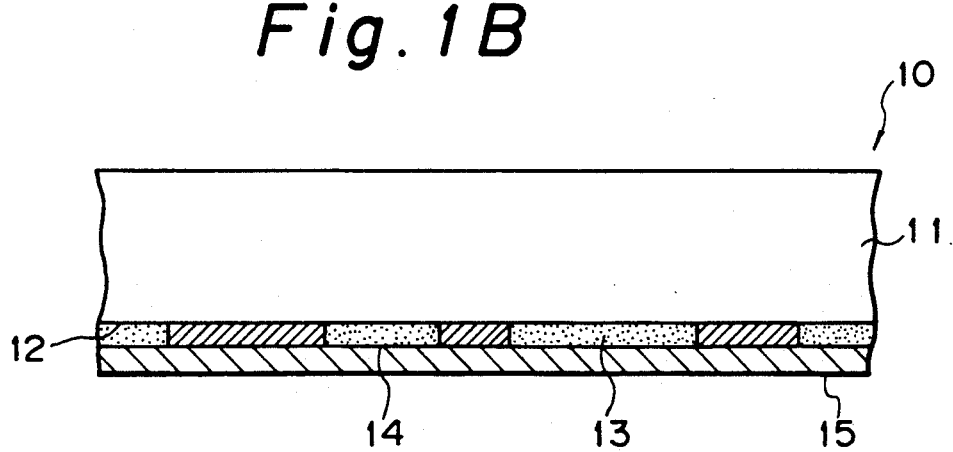

The light-emitting layer 11 consisting of the fluorescent member should not necessarily cover the entire reflection layer 14 including the through holes 12 as shown in FIG. 1A. The light-emitting layer 11 may have the same thickness as the reflection layer 14, so that the layer 11 can be formed only in the through holes 12, as shown in FIG. 1B. Although the light-emitting layer 11 comprising the fluorescent member and the protective layer 15 closely contact each other on the illustrated optical disk, if another reflection layer (not shown) is formed between the light-emitting layer 11 comprising the fluorescent member and the protective layer 15, the amount of reflection light and the amount of fluorescent light can be increased.

As the pits are filled with the light-emitting material in the above manner, the spatial frequency up to $2NA(1/\lambda 1 + 1/\lambda 2)$ can be picked up using a special pickup in the apparatus as disclosed in Published Unexamined Japanese Patent No. Hei 2-50328 applied by the present applicant, where NA is the number of apertures of the objective lens for reading information, $\lambda 1$ is the wavelength of light to be irradiated, and $\lambda 2$ is the wavelength of light to be emitted from the light-emitting material in response to the irradiated light. Accordingly, the optical disk having the above structure can record information of a spatial frequency up to approximately twice the amount possible in the prior art, thus ensuring high-density recording on an optical disk.

As described above, according to the present invention, a method of manufacturing an optical disk on which light-emitting regions for absorbing a laser beam and emitting light of a wavelength different from that of the laser beam and reflection regions for reflecting a laser beam irradiated thereon are alternately arranged, comprises the steps of forming a reflection layer on a transparent substrate, forming a plurality of through holes in the reflection layer, and filling a light-emitting layer consisting of a fluorescent member in the through holes. It is therefore possible to easily manufacture optical disks which can ensure recording/reproduction of information at high density.

What is claimed is:

1. A method of manufacturing an optical information recording disk on which light-emitting regions for absorbing a laser beam and emitting light of a wavelength different from that of the laser beam and reflection regions for reflecting a laser beam irradiated thereon are alternately arranged, the method comprising the steps of:

forming a reflection layer on a transparent substrate;

forming a plurality of through holes in the reflection layer; and filling a light-emitting member in the through holes.

2. A method of manufacturing an optical information recording medium according to claim 1, further comprising a step of forming a protective layer on said light-emitting layer.

3. An optical information recording disk comprising;

a transparent substrate;

a reflection layer formed on one flat main surface of said substrate having a track of a plurality of minute through holes formed thereon;

a light-emitting member with which said through holes are filled, said light-emitting member absorbing a laser beam and emitting a light of a wavelength different from that of the irradiated laser beam.

4. An optical information recording disk according to claim 3, wherein said light-emitting member is a photoluminescent material, fluorescent chromatophore or fluorescent member.

5. An optical information recording disk according to claim 3, wherein said substrate is formed of transparent resin such as an acrylic resin or polycarbonate, or glass.

6. An optical information recording disk according to claim 3, further comprising a protective layer formed on said light-emitting layer.

* * * * *